US007689839B2

(12) United States Patent
Uguen et al.

(10) Patent No.: US 7,689,839 B2
(45) Date of Patent: Mar. 30, 2010

(54) DYNAMIC POWER MANAGEMENT IN SYSTEM ON CHIPS (SOC)

(75) Inventors: Laurent Uguen, New Delhi (IN); Gaurav Dhiman, New Delhi (IN); Gaurav Kapoor, Moradabad (IN)

(73) Assignee: STMicroelectronics Pvt. Ltd., Uttar Pradesh (IN)

( * ) Notice: Subject to any disclaimer, the term of this patent is extended or adjusted under 35 U.S.C. 154(b) by 714 days.

(21) Appl. No.: 11/498,332

(22) Filed: Aug. 1, 2006

(65) Prior Publication Data
US 2007/0094525 A1    Apr. 26, 2007

Related U.S. Application Data

(63) Continuation of application No. 11/323,981, filed on Dec. 29, 2005, now abandoned.

(30) Foreign Application Priority Data

Dec. 31, 2004    (IN) .................. 2616/DEL/2004

(51) Int. Cl.
*G06F 1/00* (2006.01)
(52) U.S. Cl. .................................... 713/300
(58) Field of Classification Search .......... 713/300
See application file for complete search history.

(56) References Cited

U.S. PATENT DOCUMENTS

| | | | | |
|---|---|---|---|---|
| 5,388,265 A * | 2/1995 | Volk | .......................... | 713/322 |
| 5,918,061 A * | 6/1999 | Nikjou | .......................... | 713/324 |
| 6,986,074 B2 * | 1/2006 | Alia et al. | .................. | 713/601 |
| 7,032,117 B2 * | 4/2006 | Kolinummi et al. | ......... | 713/300 |
| 7,080,269 B2 * | 7/2006 | Baumgartner et al. | ....... | 713/320 |
| 7,421,591 B2 * | 9/2008 | Sultenfuss et al. | .......... | 713/300 |
| 2003/0093702 A1 * | 5/2003 | Luo et al. | .................... | 713/320 |
| 2003/0196127 A1 | 10/2003 | Olsen | ......................... | 713/300 |

OTHER PUBLICATIONS

Dynamic Power Management for Embedded Systems, IBM and MontaVista Software, Version 1.1, Nov. 19, 2002, pp. 1-25.*

* cited by examiner

*Primary Examiner*—Thomas Lee
*Assistant Examiner*—Brandon Kinsey
(74) *Attorney, Agent, or Firm*—Lisa K. Jorgenson; Robert Iannucci; Seed IP Law Group

(57) ABSTRACT

A system for dynamic power management in a distributed architecture system on chip, comprising a means for dynamically defining the feasibility of entering a low power mode of operation based on the status of components of the system, a means for entering or exiting safely from a low power state based on said feasibility, a means for decreasing the power centric communication between various processors and a means for increasing the low power mode time. Thus a framework is proposed in the instant invention wherein all the device drivers dynamically maintain the information on the feasibility of a low power transition at any point of time. Thus whenever an opportunity to enter a low power mode comes up one has to just check this feasibility variable to determine whether the low power mode entry is viable or not. For ensuring the safe transition to a low power mode, a stalling machine is proposed in case of DSPs. For further saving power, a power centric communication channel is established between various processors and to reduce the load on this communication channel techniques like quad-ring buffer and DSP feedback are proposed.

21 Claims, 8 Drawing Sheets

DYNAMIC POWER MANAGEMENT IN SYSTEM ON CHIPS (SOC)

CROSS-REFERENCE TO RELATED APPLICATION

This application is a continuation of U.S. patent application Ser. No. 11/323,981, filed Dec. 29, 2005, now pending, which application is incorporated herein by reference in its entirety.

BACKGROUND OF THE INVENTION

1. Field of the Invention

The present invention relates to a system for dynamic power management and in particular to a system for dynamic power management for distributed architecture system on chip.

2. Description of the Related Art

There has been a significant increase in the number of battery driven handheld devices. The battery technology has not advanced as fast as the technology of the power dependent hardware that runs these devices. Thus the batteries of portable and mobile devices tend to discharge relatively quickly thereby making power management a key consideration in the design of such devices.

For effective power management, the processors used in these devices support many operational modes (low power modes) that have different performance and power consumption characteristics. The processor is put into a low power state when no applications are active and when no tasks or interrupt routines need to be serviced. One of the most commonly used low power states is referred to as the "idle" state. When the processor is in idle state it stops executing instructions. The processor may be reactivated or brought out of idle upon the occurrence of some event, such as the expiration of a hardware timer, or the detection of a keyboard press or other hardware interface interrupt. The event or interrupt causes the processor to transition out of the low power state and service the interrupt. By putting the processor into the idle state (where the clock to the core is turned off), battery life may be extended, particularly in systems in which the power consumed by the processor is significant compared to that of other components such as display and memory components, thus controlling the battery consumption in handheld devices/PDAs.

The power management becomes more complex in modern system on chips (SOCs), like Nomadik (Nomadik is a multimedia application processor from STMicroelectronics), that consists of several loosely coupled multi-processors. In these system-on-chips, system designers assign tasks to the different processors and implement them independently, possibly with different operating systems in each processor. There is some communications among processors to exchange information and coordinate tasks. For the sake of simplicity in the hardware, these multiple cores may share the same frequency and voltage sources. As such the entry in any of the low power mode should be agreed upon by all the processors as well as the peripherals.

These SOCs provide many low power modes like SLOW, SLEEP and DEEPSLEEP. While in "SLOW" mode everything runs at low frequency, in case of "SLEEP" the clocks of the system are removed, and in case of "DEEPSLEEP", the clocks along with the power of the system are removed as well. Although these modes have very low power consumption characteristics, they cannot be entered all the time since the system is rendered inoperable in these modes. Besides this, there are latency cost in terms of time and energy that one should confront with while entering and exiting these modes. But in a system that spends most of its time idling, it may be desirable to take advantage of low power state, reduce power consumption, and thereby extend the life of the battery.

Conventional operating systems however take advantage of these low power states in only two conditions:
  a. When the user powers off the device.
  b. Whenever the high-level power management function determines that the device should be turned off, for example, due to user inactivity.

Existing computing devices such as Compaq Computer Corporation's Itsy Pocket Computer and the PALM PILOT, by way of example, implement SLEEP state in the above mentioned ways only.

Conventional operating systems offer an idle function that is called whenever the core is idle i.e. there is no thread ready to run. This is the only guaranteed place where the core will definitely be idle. Out here the low power modes like SLEEP or DEEP SLEEP can be utilized. But the question remains on the feasibility of entering these low power modes.

United States Patent Application 20030196127 discloses a system, wherein low power modes like SLEEP and DEEP SLEEP might be entered if the time to be spent in the idle function is substantial. Normally, the operating system provides information on how long there is no thread schedulable in the system. So, one can get an idea about the maximum possible duration of this idle period. Also, one might wait for a specified amount of time and if the core is still idle, SLEEP or DEEP SLEEP might be entered assuming that the actual idle period duration would be long enough. However, there are some shortcomings of above approach. First, the exact duration for which the core would remain idle is difficult to predict. There is a possibility that an external interrupt may make the core active again. Secondly, the approach stated above safely assumes that the level of activity on the central core is an indicator of the level of activity in the rest of the system. If the central processor becomes idle for a long time, the approach stated above assumes the entire system to be inactive and enters SLEEP mode. This is fine for systems with only core as the primary or may be the only component but is not a suitable assumption for modern complex systems (with distributed architecture like Nomadik) where there are multiple processors. In such cases the entry into any of these low power modes by just observing the core to be idle can prove disruptive. The solution proposed in US 20030196127 does not talk about the feasibility of low power mode transitions for such distributed architectures.

One of the most obvious ways of ensuring inactivity in such distributed architecture systems could be to query each and every component about their willingness. However, this approach has several shortcomings. First, this approach consumes a lot of time just to know whether a low power mode can be entered or not. Second, the time when the drivers are queried, energy is wasted since the core is being kept busy in the query process.

FIG. 1 shows the timing diagram of a this kind of power management system that depicts the transition between the idle state and the running state, wherein the core is running and actively consuming power when it is supposed to be idle. The portion of idle time that can be effectively used for aggressive power management is being wasted just for testing feasibility of a low power transition. Hence, this approach is costly in terms of both time and power.

Thus, there is a need for effective power management for systems with distributed architectures. In particular, there is a need for a power management system that takes into consideration the operating state of each processor/peripheral for deciding the transition to a low power mode.

BRIEF SUMMARY OF THE INVENTION

One embodiment of the present invention provides a system for effective dynamic power management in a loosely coupled multi-processor environment. The system provides a safe transition between multiple power modes, decreases the power related communication between multiple operating system running on multiple processors, and increases the time spent in low power mode by the system.

One embodiment of the present invention provides a system for dynamic power management comprising:

a means for dynamically defining the feasibility of entering a low power mode of operation based on the status of components of the system, and a means for entering or exiting from a low power state based on said feasibility.

The invention further provides an SOC with efficient power management comprising:

a plurality of processors;

a plurality of peripherals;

a means for dynamically defining the feasibility of entering a low power mode of operation based on the activity status of at least one of said processors or said peripherals; and a means for entering or exiting a low power state based on said defined feasibility.

The invention also provides a method for efficient power management in SOCs, the method comprising the steps of:

maintaining feasibility variables corresponding to different operating modes of the SOC;

receiving power requirements from different components of the system;

locking/unlocking said feasibility variables corresponding to different operating modes of SOC based on said power requirements of different system components; and checking said feasibility variables and changing the operating mode of SOC based on said feasibility variables In one another embodiment, the invention discloses an SOC with efficient power management comprising:

a central processor core running the native operating system;

a hardware accelerator containing a digital signal processor (DSP);

a means for dynamically defining the feasibility of entering a low power mode of operation based on the activity status of at least said hardware accelerator; and a means for entering or exiting from a low power mode based on said defined feasibility, wherein a communication channel exists between the DSP firmware and the native operative system running on central processor core through which the DSP firmware provides an estimate of its power needs to native operating system running on central processor.

Thus, a framework is proposed in the instant invention wherein all the device drivers dynamically maintain the information on the feasibility of a low power transition at any point of time. Thus whenever an opportunity to enter a low power mode comes up one has to just check this feasibility variable to determine whether the low power mode entry is viable or not. The framework also proposes creation of various communication messages between different processors in order to increase the power saving of the system, without stalling the hardware.

BRIEF DESCRIPTION OF THE SEVERAL VIEWS OF THE DRAWINGS

The invention will now be described with reference to the accompanying drawings.

DETAILED DESCRIPTION OF THE INVENTION

In a loosely coupled multi-processor system on chip, like Nomadik, where the various processors and peripherals share the same frequency and voltage source, the system can go in low power mode only and only when all the components are willing to go. In such systems generally the frequency and voltage is controlled by the central processor. The most obvious way of ensuring inactivity is to query each and every component about their willingness. However, this approach is costly both in terms of activity and time duration.

One embodiment of the invention herein proposes a system for effective power management in such systems.

One embodiment of the invention proposes a framework for expediting the whole process of going in low power state by maintaining feasibility locks. Another embodiment of the invention also proposes a stalling machine in case of a task specific processor like DSPs (Digital Signal Processor) to ensure the safe transition of the system to move in low power mode. Another embodiment of the invention also tries to reduce the power centric communication between the central processor and specific task processors like DSPs by using ring buffers. This is done to increase the time spent in low power mode as well as to reduce the number of interrupts and the number of transitions between low power mode and high power mode. Furthermore, to enhance the efficiency of the framework, the invention also proposes a feedback mechanism from the OS running on the DSP (firmware) to the OS running on the central processor to inform the MIPS (Million Instructions Per Second) requirement of the DSP.

In one embodiment of the present invention, the system maintains global feasibility variables which are based on the number of low power modes supported by the system. These feasibility variables are accessible to all components present on chip whose operating state needs to be considered for transition to any of the low power modes supported by the system. The client drivers for all such components are allowed to lock or unlock the above feasibility variables based on their operating state. If a client driver feels that it is busy and the entry to one of the low power modes can disrupt its functionality, it can perform a lock on the appropriate feasibility variable thereby preventing any such transition. Likewise if a client driver feels that it is inactive (or idle) and is not affected by an entry into a particular low power mode, it can release this lock permitting such transitions. Power scheduler software running on the central processor keeps on checking these variables at certain specific times. One such time is during the entry of an Idle thread. In case if any of the drivers has put the lock, the transition to that low power mode (like SLEEP) would not happen.

Figure 1:
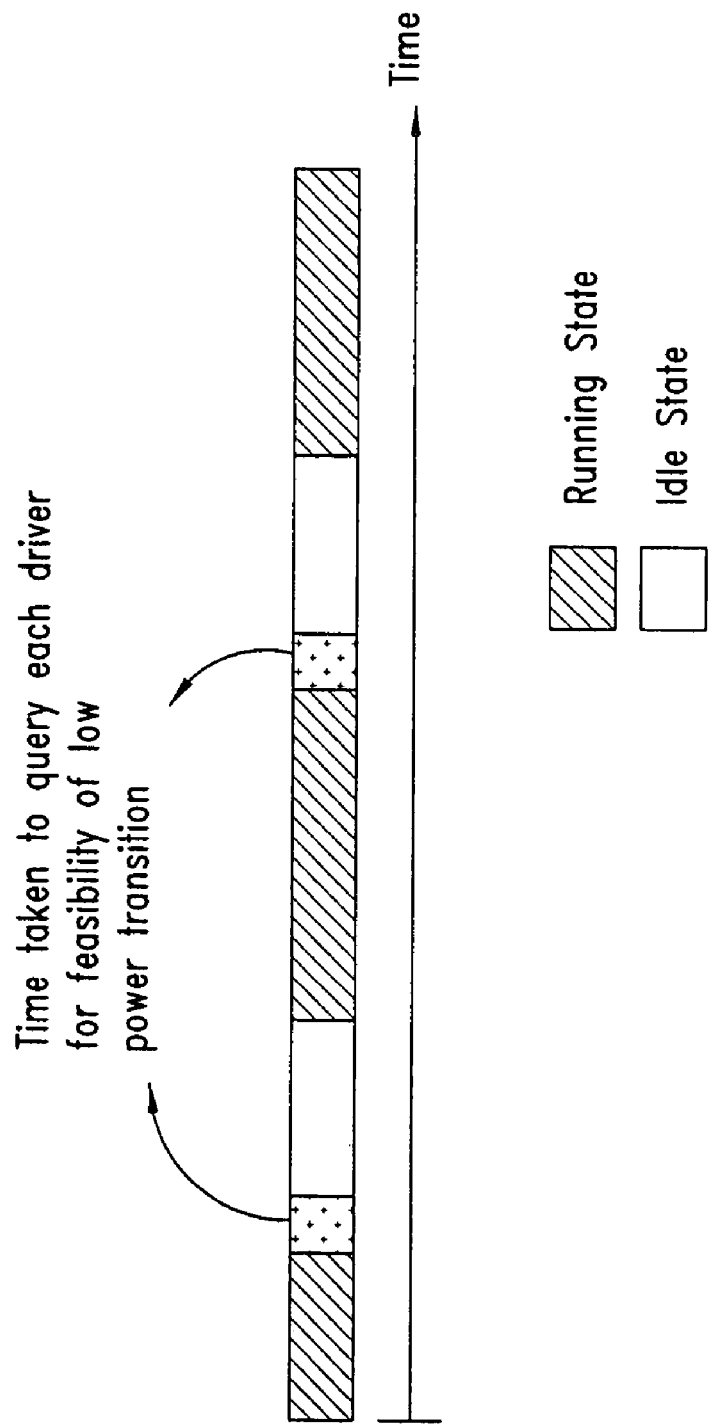
FIG. 1 illustrates a conventional timing diagram depicting the transition between idle state and running state, when each system component is queried for its power requirement.
Figure 2:
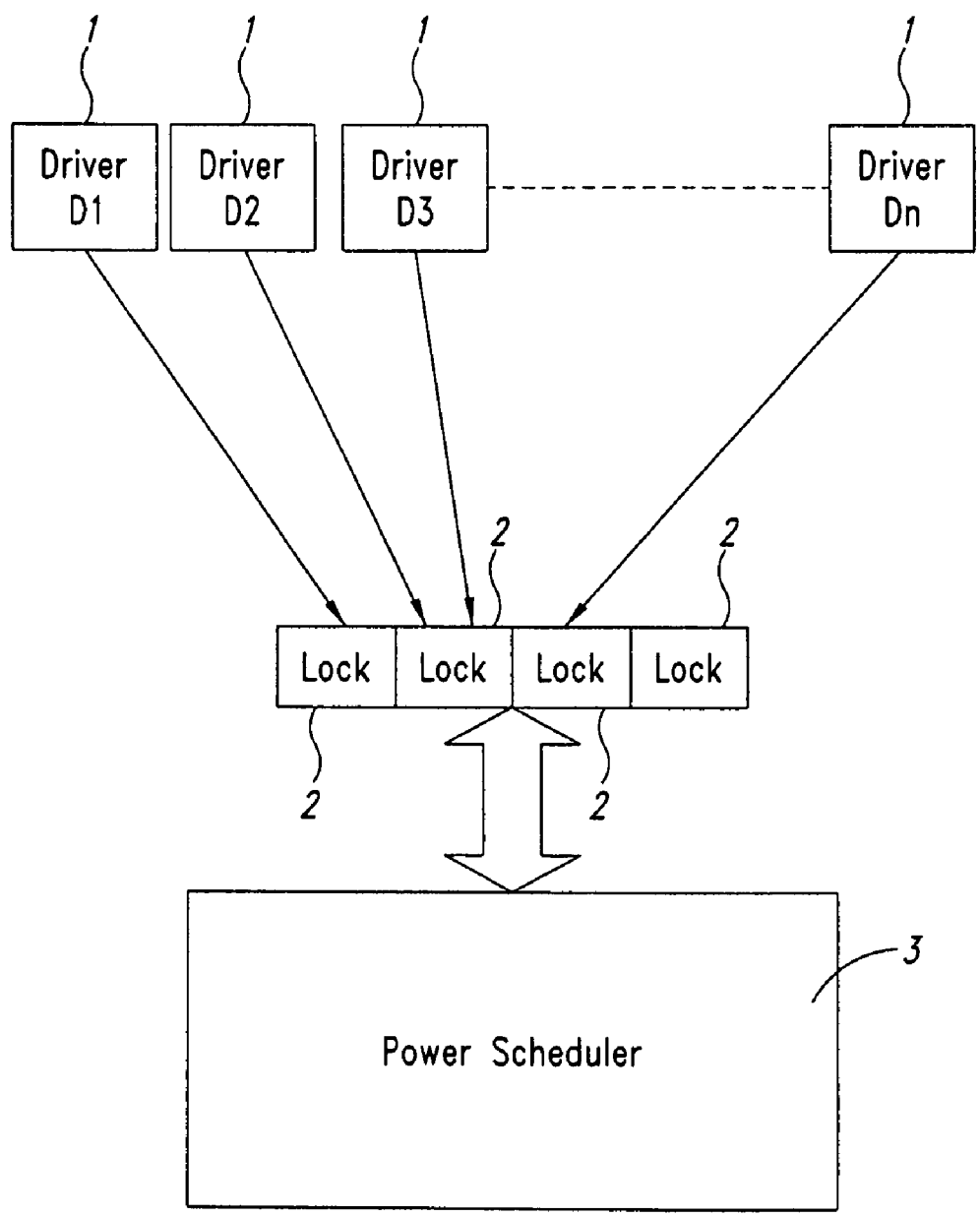
FIG. 2 illustrates the overview of the proposed architecture

FIG. 2 depicts the above mentioned embodiment. The drivers [1] have their own activity machines. These activity machines differ from case to case. Based on these activity machine, drivers [1] maintain their requirement on the feasibility locks [2]. Power scheduler [3] keeps on checking the values of these feasibility locks at specific instances. One such instance is the entry of the central processor in the Idle thread. Another can be during the exit of the Idle thread. Based on the values of the feasibility locks, the power scheduler makes a decision about the transition to any of the low power modes.

In one embodiment of the invention, the system maintains four feasibility variables for four different power modes NORMAL, SLOW, SLEEP and DEEPSLEEP respectively. All client drivers have access to these feasibility variables and can lock/unlock these feasibility variables. E.g. if a particular component is not available for transition to SLEEP MODE but can work in SLOW mode, its driver simply locks the feasibility variable corresponding to SLOW mode. The driver then unlocks the SLEEP mode feasibility variable when the component is again ready to switch to even lower power modes. In the meantime, the power scheduler may check the feasibility variables and take the system to SLOW mode if the feasibility variable corresponding to NORMAL mode is not locked by any client driver. One of ordinary skill in the art can appreciate that locking/unlocking of feasibility variable here can be any kind of modification of the feasibility variables. In one preferred embodiment, the locking/unlocking is done by simply incrementing/decrementing a number.

In one other preferred embodiment of the system, the components also lock the minimum frequency in a specific operating mode that is required for their operation. For example, the system in normal mode may be able to work at many different frequencies from within a range of frequencies. In this case, the client drivers, in addition to the operating mode information also provide information on the minimum frequency within that operating mode that is required for their working. E.g. if in slow mode the system can work from frequencies $f_1$ to $f_2$ and if a particular component wishes to lock slow mode it will also lock the minimum frequency within range $f_1$ to $f_2$ in slow mode which is required.

The inherent advantage of this invention is that an instant information on the feasibility of low power state transition is available which dramatically reduces the decision making time required for low power transitions. In the absence of this feasibility framework, it is difficult to know whether the rest of the system (apart from the core) is active or inactive. One alternative is to query each driver if they permit this transition. In this case, the major portion of the time will be wasted just for testing the feasibility of a low power transition. This time otherwise could have been used for active power management. In several cases the time consumed for querying may rule out the possibility of entering a low power state. Moreover even if the low power transition is not feasible then also time and energy is being wasted in this querying process. This amount gets summed up over a period of time and can become significant in terms of opportunities wasted in terms of saving power effectively. In sum, the framework provides more idle time which increases the probability of entering a low power state thus providing more power savings over a period of time.

Figure 3:
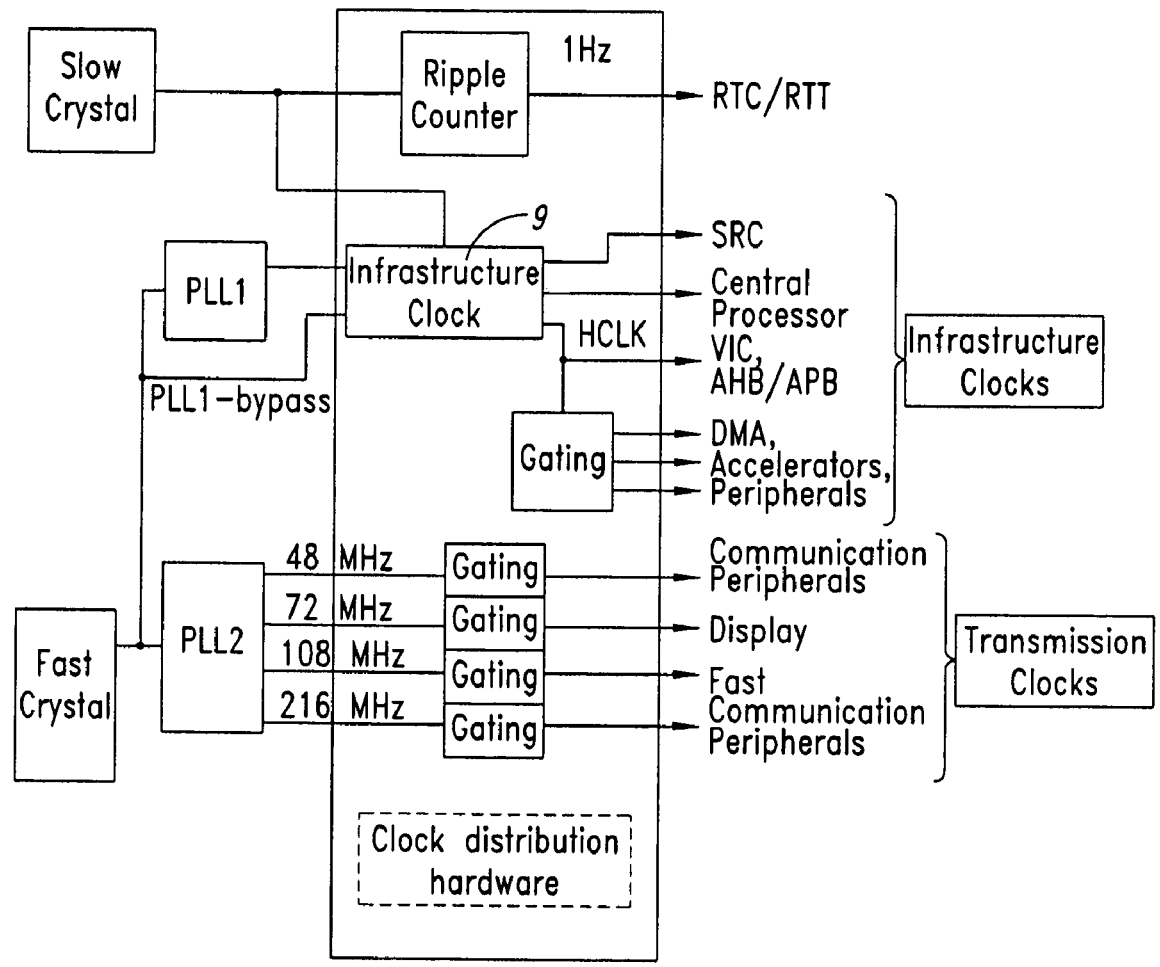
FIG. 3 illustrates a simplified clock diagram showing the generation of different operating modes.

The invention can be understood with the help of FIG. 3 which explains how different low power modes can be generated. FIG. 3 shows the simplified clock diagram which is divided into two parts one is infrastructure clock and other is transmission clock. As shown in FIG. 3 there are two two-phase lock loops (PLL1 and PLL2). PLL1 can be configured to output variable frequencies, whereas PLL2 supplies fixed frequencies. The output of PLL1 is used to power infrastructure buses, a central processor, direct memory access (DMA), audio accelerators, video accelerators and other DSPs. The output of PLL2 is used by the peripheral for transmission or reception. In this system, there are three operating modes: NORMAL mode where everything is running for the output of PLL1; SLOW mode where PLL1 is bypassed and stopped but PLL2 keeps on working; SLEEP mode where both PLL1 and PLL2 are stopped. Another mode can be envisioned as DEEPSLEEP mode where the power supply from the major portion of the chip is also cut off. Depending on the type of hardware the change in the frequency of PLL1 can be dynamic or not. The present invention deals with both types of hardware. The software has to take extra care if the hardware does not support the dynamic change in the frequency. In this case, the software first switches off the PLL1 by going in SLOW mode and then to reprogram it to the desired frequency. During the transition the hardware freezes and thus the software has additional responsibility to avoid the underflows. Our invention tries to solve this problem by reducing these transitions by employing methods such as ring buffer approach and firmware feedback which are explained in the later sections.

In some components like hardware accelerators, the transition to low power modes can not be done easily like for other system components. There are processes running in these components which can not be suddenly stalled. To provide solution for this kind of system, the present invention proposes a stalling mechanism that allows transition to low power modes.

Figure 4:
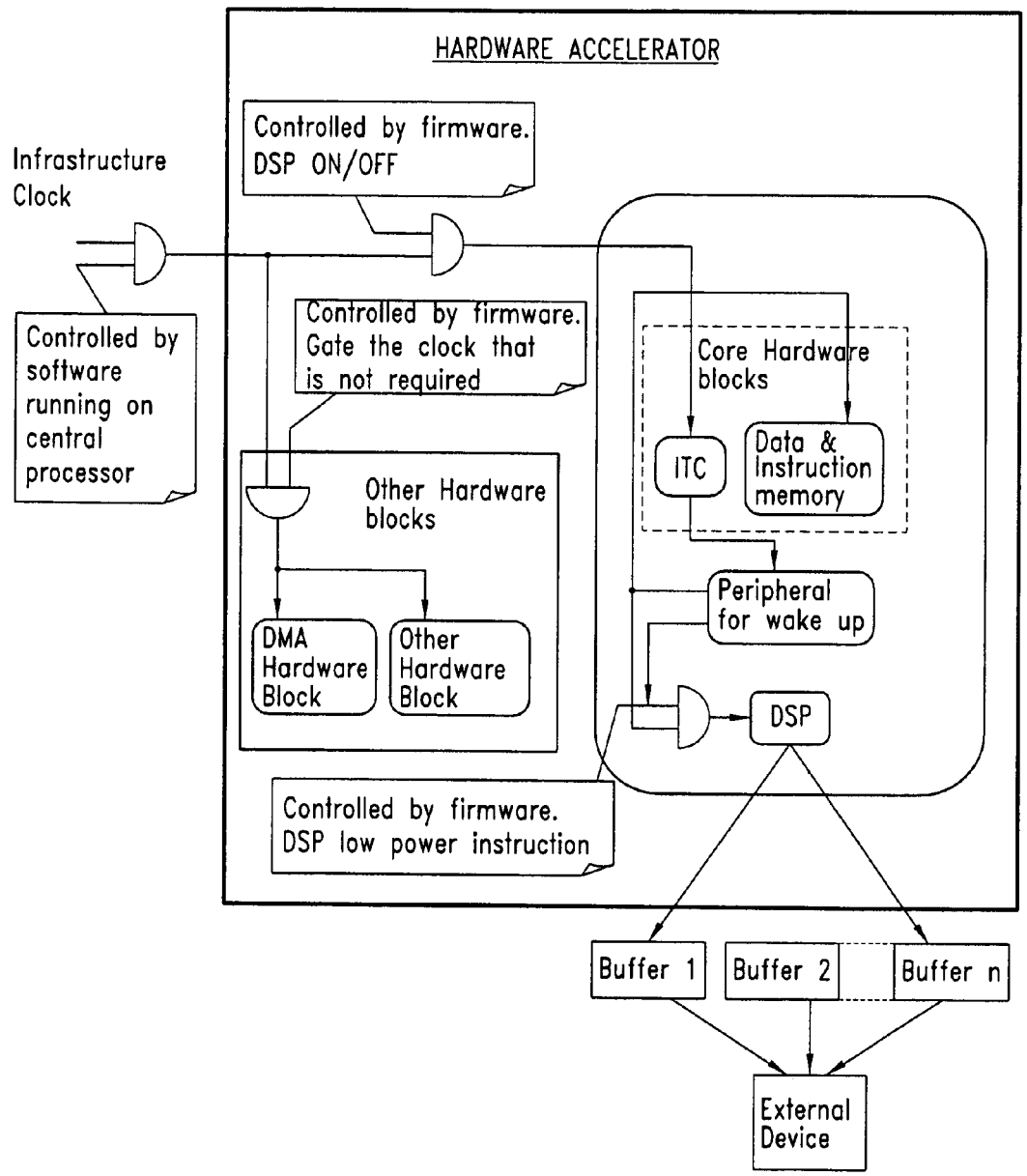
FIG. 4 illustrates the power saving modes of a hardware accelerator.

This problem can be better understood with the help of FIG. 4 which depicts the internal structure of a typical hardware accelerator. The firmware in the hardware accelerators can gate the clock supplied to some of the internal components of the hardware accelerator. The firmware can also gate the DSP clock and can program the wake up circuitry. The software running on the central processor can also gate the whole accelerator clock and save maximum power. Care should be taken that the accelerator, or any other bus master, must not be doing any bus access when its clock is gated. If the clock of the DSP is cut when it has been granted the slave, then the whole system will be stalled thereby leading to the failure of the hardware.

For this, the invention proposes a "Stalling" machine. A new SLEEP [13] message for the accelerator is created. The native operating system, running on central processor, will send this 'SLEEP [13]' message to the hardware accelerator when it wants to switch off the clock. It may take some time for the firmware to take into account this SLEEP [13] message, because of firmware OS scheduler policy, context switch time etc. The native operating system must ensure that the accelerator did enter low-power mode before cutting its clock. For this either an interrupt message can be sent by the accelerator to the central processor, or alternatively the central processor can periodically poll the accelerator register showing its status. This periodic polling state [14] is called "Stalling" state [12] as shown in the FIG. 5. On the native operating system side, while "Stalling" all OS messages are postponed and saved in a queue, so that the overall central processor and accelerators system remains stable. On the firmware side, in the SLEEP management routine, the firmware masks every interrupt source other than the central processor, so that the accelerator is not woken up by say a lingering DMA transfer. After receiving wake-up message from the central processor, firmware processes it as usual.

Figure 5:
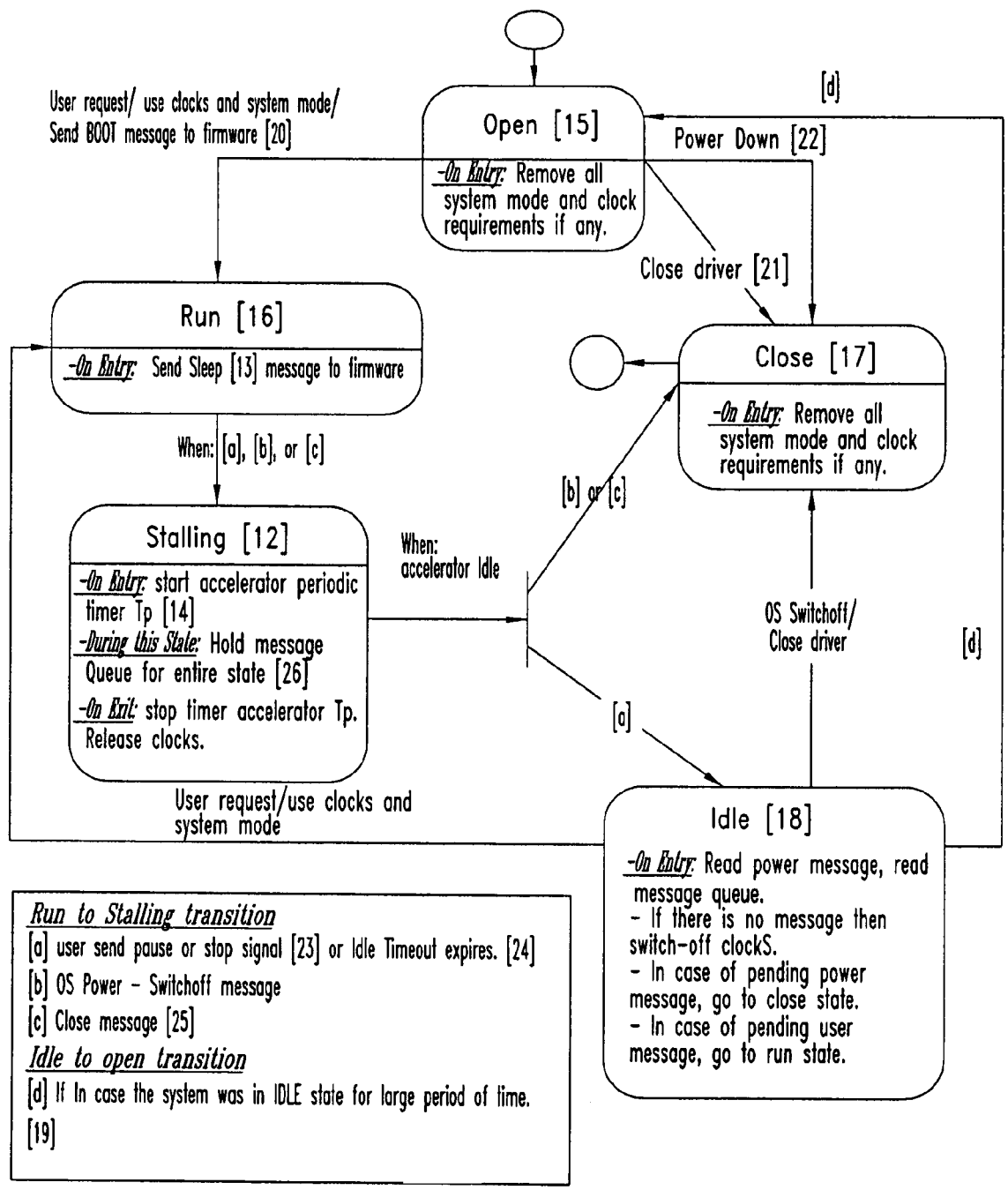
FIG. 5 illustrates the power states of any generic driver.

In general our invention proposes the power state diagram of any device driver as described in FIG. 5.

The Open State [15] is the initial state of the driver. This state is reached either when the driver is loaded or when it was in 'No Activity' state for a large period of time [19]. On entry to this state, driver will ensure that it has released all the locks. On receiving some message from the user, the driver running on the host operating system will open the clocks, download and boot the firmware if required [20]. The state is now Run State [16]. On receiving a Close [21] or Switch-Off [22] message in the open state [15], the driver moves directly to the Close state [17].

The next state of the component is the Run State [16]. This is the main 'running' state of the driver. The state is reached as a result of any message from the user. The power is saved in this state generally through the firmware gating the clock of the hardware. There can be many reasons to exit this state such as when a user sends stop or pause signal [23], or there was no activity for a large period of time [24], or the user simply unloads the driver [25]. The next state is the Stalling state [12]. However, before going to Stalling state, the firmware should also send a message to an external entity like base-band. This is necessary if the firmware was earlier directly communicating with it without any interference of the central processor. On receiving this information the base-band, or the external entity, should not send any further message directly to the accelerators.

The next state of the component is the Stalling state [12]. In this state, the "Stalling machine", which is described above, is implemented. All messages received by the driver during this state are queued in a message queue [26].

The next state of the component is the Idle state [18]. On entry to this state, the driver checks the status of the message queue [26]. If there is a message pending in the message queue [26], then that message is executed and driver moves to the corresponding state accordingly. In case there is no message in the message queue, the driver simply switches off the clock.

The final state of the driver is the Close state [17] and this is reached as a result of Switch-Off message or due to the unloading of the driver. The driver ensures that it has freed all the locks.

The whole state machine can be summarized as:—

| Event | Current state | Action | New state |
|---|---|---|---|
| User Request (boot) | Open [15] | Open clocks, set the required system lock, download the firmware and send BOOT message to the accelerator, if required | Run [16] |
| Close driver | Open [15] | None | Close [17] |
| Switch-Off message from OS | Open [15] | Notify the upper layers that the accelerator is shutting down | Close [17] |
| User send pause/stop signal; or Idle Timeout Message[a] Switch-Off message from OS [b] Close driver [c] | Run [16] | Send SLEEP to the accelerator | Stalling [12] |
| Accelerator low power mode register not set | Stalling [12] | Schedules the timer again | Stalling [12] |
| Accelerator low power mode register set | Stalling [12] | [a] → Release clock [b]or [c] → release locks and clocks [b] → Notify the driver user that the accelerator is going down | [a] → Idle[18] [b] or [c] → Closed [17] |
| Any user request | Idle [18] | Use clocks | Run [16] |
| Switch-Off message from OS | Idle [18] | release power locks Notify the driver user that the accelerator is going down | Close [17] |
| Close driver | Idle [18] | release power locks Notify the driver user that the accelerator is going down | Close [17] |

For further saving power in accelerator's RUN [16] state, it is desired, that the whole system should run in low frequency mode whenever possible. In our architecture the frequency of SLOW mode depends on the external crystal [30], and it is also very likely that this frequency is less than what is required by Audio, Video and other accelerators for their work. This severely reduces the possibility of going in low power mode when the accelerators are working. In the accelerators it is the DSP that imposes this restriction on the minimum frequency.

In complex SOCs having a distributed architecture, while the native operating system is running on the central processor that maintains global feasibility variables, the DSP in hardware accelerators run a different operating system. While client drivers of the hardware accelerators have access to the feasibility variables, the DSP firmware does not have the direct access to feasibility variables. This reduces the possibility of operating in low power mode. For efficient power management in such scenarios, in one embodiment the invention proposes a direct communication channel between the firmware and native operative system thereby allowing the DSP firmware to directly give its requirements to native operating system in complex distributed architecture SOCs.

For further enhancing the efficiency of the system and reducing load on communication channel between firmware and native operating system, a ring buffer is used at the firmware side instead of normal double buffer approach. In a preferred embodiment, a quad buffer is used for firmware operation which leads to less power related communication between the firmware and native operating system.

Figure 6A:
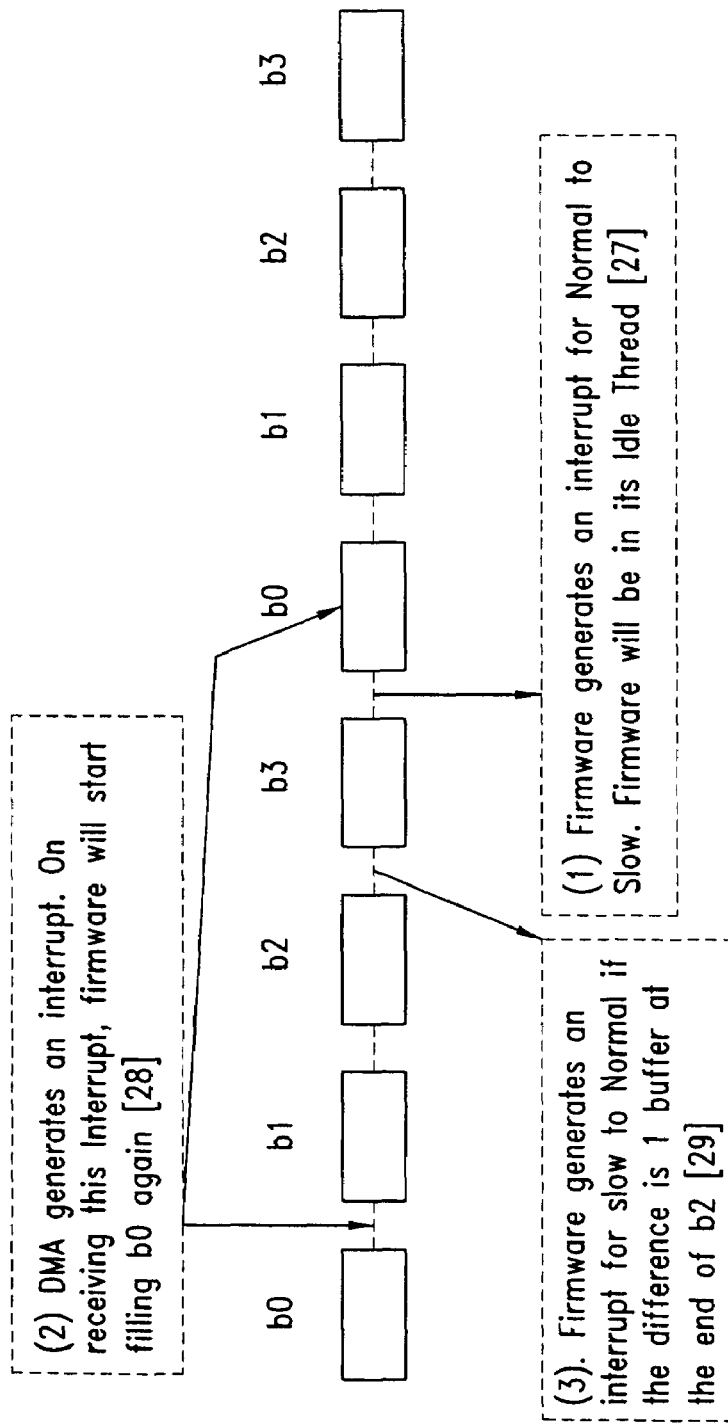
FIGS. 6a & 6b illustrates the ring buffer approach
Figure 6B:
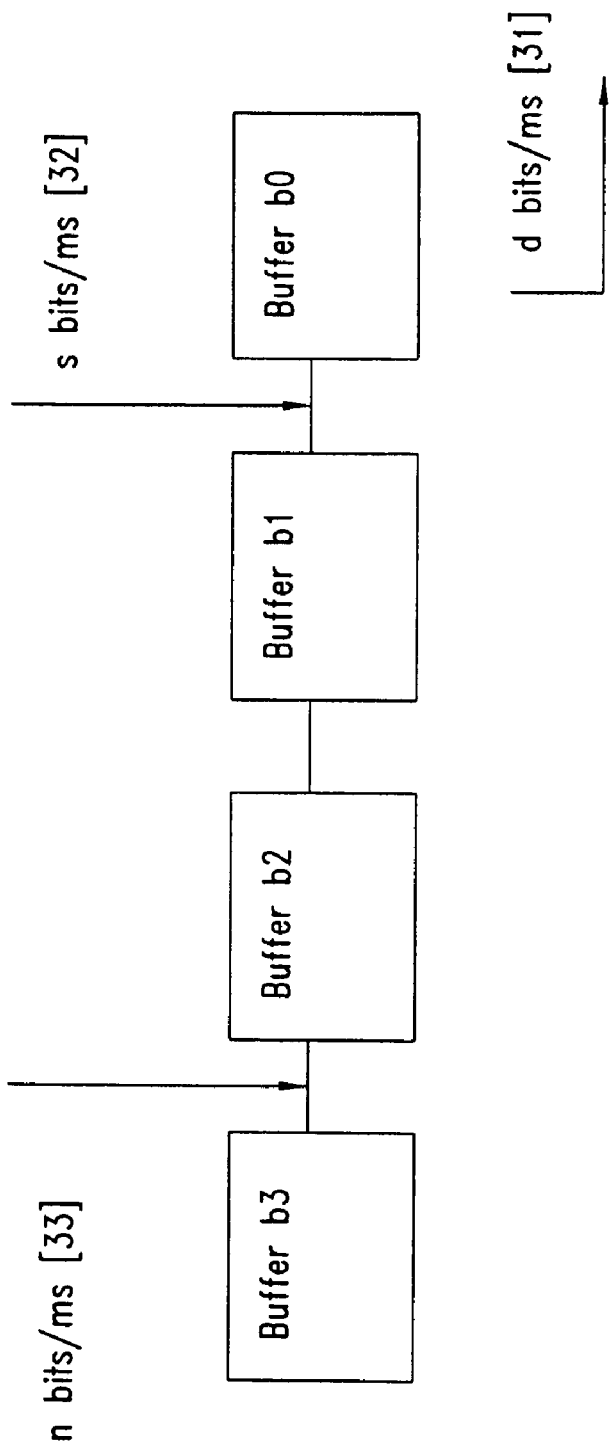

The above mentioned ring buffer approach is explained in FIGS. 6a and 6b. Initially, the firmware fills four buffers (b0-b3), puts DMA to start transfer of data, and goes in Idle thread. In the Idle thread it will pass a message to inform the central processor to allow it to go in SLOW mode [27]. When the transmission of first buffer is completed, DMA generates an interrupt to firmware [28]. On receiving this interrupt, the firmware starts filling the first buffer again but this time (most probably) in SLOW mode.

An interrupt is generated from the DMA after it completes the transmission of each buffer. After every DMA interrupt, the firmware checks the number of pending buffers i.e. the buffers that are filled. When the number of pending buffers is equal to one, then the firmware passes a message to the central processor to move it in NORMAL mode [29]. This condition arises when the DMA drain speed [31] is more than the speed [32] at which the firmware fills the buffer. As soon as the system moves into NORMAL mode, the rate of filling [33] once again exceeds the rate of drain [32], and thus the firmware quickly fills all the four buffers, and move to idle state [27]. In this state, it again passes a message to the central processor to go in SLOW mode [27]. In order to reduce the communication load and the number of transitions, this message is passed only and only if the firmware has previously instructed the central processor to go in NORMAL mode.

One of the advantages of this approach is that it increases the time spent in SLOW or low frequency mode. If d is the actual MIPS required for working by the accelerator [31], s is the MIPS available in SLOW or low frequency mode [32] and n is the MIPS available in the NORMAL mode [33], then $$\frac{TotalLowFrequencyModeTime}{TotalNormalModeTime} = \frac{1 + \frac{2d}{d-s}}{\frac{3d}{n-d}}.$$

The closer the value of d and s, the higher is the power saved.

Another advantage of this approach is that it decreases the number of SLOW to NORMAL mode and NORMAL to SLOW mode transitions. Moreover, this approach also makes the firmware independent of the job being executed. For example, if the audio accelerator can decode a stream in low power mode, then the approach guarantees that the system always runs in low frequency mode. The reason is that as soon as one of the buffers becomes empty, the DMA informs the firmware [28] and the firmware starts filling it at a speed, which is much more than the DMA draining speed. Again, after all the four buffers are filled, firmware goes to the idle mode [27]. However, since this time it has not previously passed a message to central processor to go in NORMAL mode, therefore it will not give another message, thereby reducing the load on the communication channel.

It is another advantage of the approach that it allows the accelerator to work in isolation. The firmware need not to know the current mode of the system as well as the value of the low mode frequency. This is best understood by the case when in the system two accelerators, say audio and video are working and the system was running in NORMAL mode because of the video accelerator. The audio firmware, after filling all four buffers, passes a message to central processor allowing it to run in low power mode. However, because of the video accelerator the system never goes to the SLOW mode. After the transmission of one buffer is completed the DMA generates an interrupt to the audio accelerator. On receiving this interrupt, the audio firmware starts filling the first buffer again and as the system is running in NORMAL mode, it quickly fills the buffer and moves to idle thread. However, as previously it never instructed the central processor to go in NORMAL mode, so this time it does not generate any message. Thus the firmware does not need to know the status of the whole system as well as the frequency of the low power mode.

Figure 7:
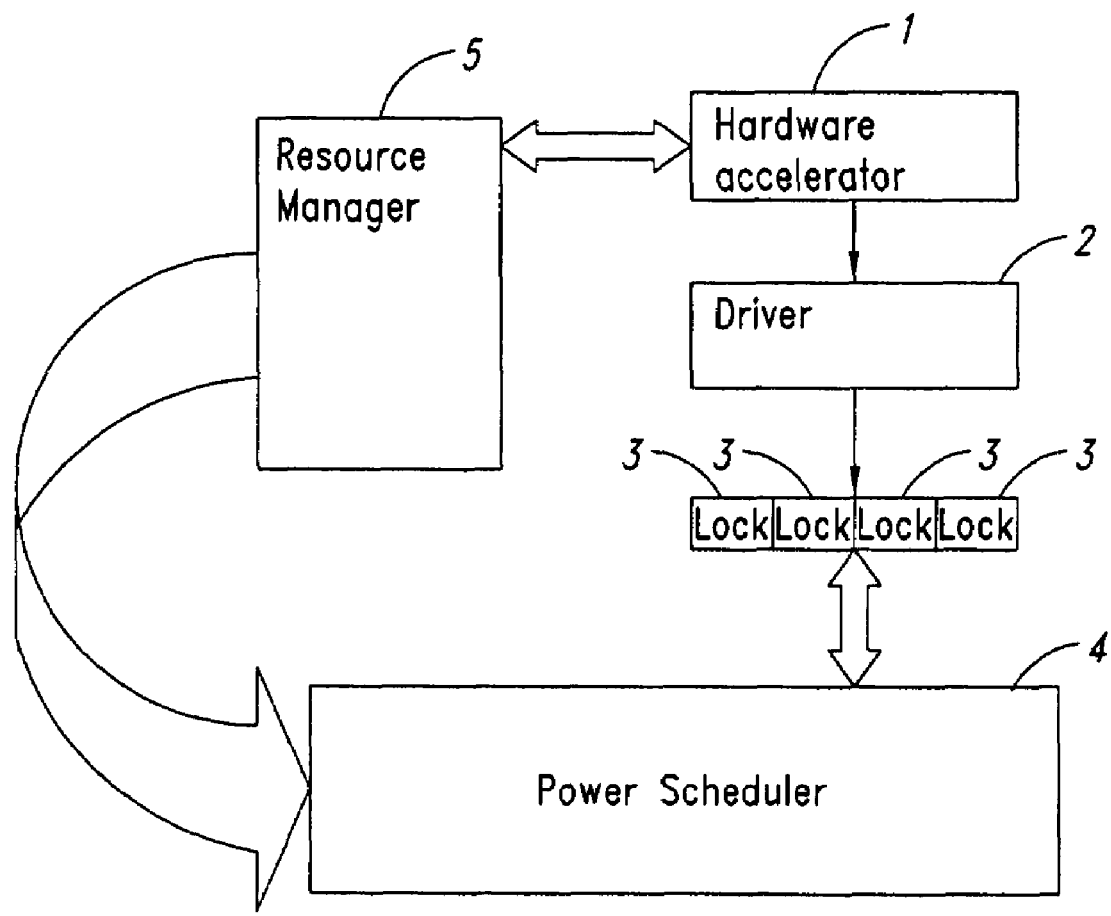
FIG. 7 illustrates the inclusion of resource manager to further enhance the technique

To further increase the efficiency of the system, the invention proposes the addition of certain heuristics. In one embodiment, the invention includes a high level entity known as a resource manager that runs over some complex components like hardware accelerators. The job of the resource manager is to guess the minimum MIPS required by the corresponding component like hardware accelerator. FIG. 7 shows the embodiment that includes a resource manager [5] that is in direct data communication with a hardware accelerator [1]. The resource manager [5] provides the hardware accelerator a job to perform and simultaneously predicts the MIPS requirement of the accelerator. It then informs the power scheduler [4] about its prediction. The power scheduler [4] on receiving this message from the resource manager [5] fixes this as the lowest possible frequency of the system. The firmware starts executing the job and fills all four buffers. It then passes the message to the central processor to move the system in low power mode. However, as the requirement of the minimum frequency mode has already been set by resource manager, the system doesn't go in SLOW mode but instead runs at the frequency stipulated by the resource manager. As soon as the transmission of one of the buffers is completed, the DMA informs the firmware and firmware again starts executing the job. As the system is still running at MIPS higher than required, therefore the firmware again fills this buffer quickly. Thus the whole job is executed at the frequency stipulated by the resource manager.

In the invention, the resource manager does not need to be accurate and fast. If its prediction is wrong, only the ratio of low power mode and high power mode will be less, but the system will be still protected.

It is another advantage of this approach that it allows to dynamically add or remove the enhanced processing from the accelerators without introducing any artifacts. The addition of this 'enhanced processing' raises the MIPS requirement of the accelerator whereas the removal of these 'enhanced processing' decreases the frequency requirement. When a user requests this enhanced processing, it is possible that the resource manager is not able to detect accurately the additional MIPS requirement. However, even in this case, there will be no artifacts in the system. This is because by virtue of design, firmware can still ask the central processor to raise the frequency whenever there is only one buffer pending. On the other hand, it is also possible that the resource manager is correctly able to detect the additional MIPS requirement, but the central processor may not immediately service this request. The reason may be the lack of support of dynamic change in the PLL frequency. However, as there is always a guaranteed buffer pending in the firmware, therefore this delay of request does not create any unwanted artifacts.

It is another advantage of the system that it can work in case of the tasks that have variable MIPS requirement. An example of this is the variable bit rate stream decoding.

Further enhancement in the system is possible by providing a path of feedback from the firmware to the resource manager. The firmware runs on a DSP and as such can accurately determine the frequency requirement of the DSP. This information it can pass to the resource manager as shown in FIG. 7. The resource manager, on receiving this information, can update its prediction and set the appropriate lock on the minimum frequency requirement.

As stated because of the robustness of the invention, the system works fine even if the passage of the information is not fast or even if the information passed is not accurate.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

We claim:

1. A system on chip with efficient power management, comprising:
    a plurality of processors, each processor being configured to selectively lock and unlock each of a plurality of global feasibility variables based on a power requirement of the processor, the plurality of global feasibility variables respectively corresponding to distinct power modes of the system on chip;
    a plurality of peripherals, each peripheral being configured to selectively lock and unlock each of the plurality of global feasibility variables based on a power requirement of the peripheral;
    a means for dynamically defining a feasibility of entering a low power mode of operation based at least in part on at least one of said processors or said peripherals locking or unlocking one or more of the global feasibility variables; and
    a means for entering or exiting a low power state based on said defined feasibility.

2. A system on chip as claimed in claim 1, wherein said locking/unlocking is done by incrementing/decrementing the feasibility variables.

3. A system on chip as claimed in claim 1, wherein a global feasibility variable is maintained for each possible operating mode of the system on chip.

4. A system on chip as claimed in claim 1, wherein a minimum frequency of operation in a specific operating mode is also defined based on an activity state of at least one of said processors.

5. A system on chip as claimed in claim 1, further comprising a stalling machine attached to some of the peripherals for smooth transition to low power modes.

6. A system for dynamic power management in a system on chip, comprising:
    a plurality of components, each component being configured to selectively lock and unlock each of a plurality of global feasibility locks based on a power requirement of the component, the plurality of global feasibility locks respectively corresponding to distinct power modes of the system on chip;
    a means for dynamically defining a feasibility of entering a low power mode of operation based on at least some of the plurality of components locking or unlocking the feasibility locks, and
    a means for entering or exiting from a low power mode based on said defined feasibility.

7. A system as claimed in claim 6, wherein said locking/unlocking is done by incrementing/decrementing the feasibility variables locks.

8. A method for dynamic power management in a system on chip, said method comprising the steps of:
    maintaining feasibility variables that respectively correspond to different operating modes of the system on chip;
    providing access to said feasibility variables for different system components of the system on chip to selectively lock or unlock said feasibility variables depending upon power requirements of the components; and
    checking said feasibility variables and changing the operating mode of system on chip based on said feasibility variables.

9. A method for dynamic power management as claimed in claim 8, wherein while locking a particular feasibility variable corresponding to a specific operating mode, the system components also locks a minimum frequency of that operating mode.

10. A method for dynamic power management as claimed in claim 8, wherein said locking or unlocking is done by incrementing/decrementing the feasibility variables.

11. A method for dynamic power management in a system on chip, said method comprising the steps of:
    maintaining feasibility variables that respectively correspond to different operating modes of the system on chip;
    receiving indications from different components of the system to lock/unlock a particular one or more of the feasibility variables;
    locking/unlocking the particular one or more feasibility variables based on said received indications of different system components; and
    checking said feasibility variables and changing the operating mode of system on chip based on said feasibility variables.

12. A method for dynamic power management as claimed in claim 11, wherein while locking a particular feasibility variable corresponding to a specific operating mode, the system components also locks a minimum frequency of that operating mode.

13. A method for dynamic power management as claimed in claim 11, wherein said locking or unlocking is done by incrementing/decrementing the feasibility variables.

14. A system on chip with efficient power management, comprising:
    a central processor core running a native operating system;
    a hardware accelerator containing a digital signal processor (DSP), the hardware accelerator being configured to selectively lock and unlock each of a plurality of global feasibility variables based on a power requirement of the hardware accelerator, the plurality of global feasibility variables respectively corresponding to distinct power modes of the system on chip;
    a means for dynamically defining a feasibility of entering a low power mode of operation based on at least said hardware accelerator dynamically locking or unlocking one or more of the global feasibility variables; and
    a means for entering or exiting from a low power mode based on said defined feasibility,
    wherein a communication channel exists between firmware of the DSP and the native operative system running on central processor core through which the DSP firmware provides an estimate of its power needs to the native operating system running on the central processor.

15. A system on chip as claimed in claim 14, wherein the DSP firmware can selectively lock and unlock said feasibility variables through said data communication channel with the native operating system depending upon its power requirements.

16. A system on chip as claimed in claim 14, wherein said DSP firmware uses a ring buffer approach for reducing power related to data communication with the native operating system.

17. A system on chip as claimed in claim 16, wherein four buffers are used in said ring buffer approach.

18. A system on chip as claimed in claim 14, further comprising:
   a resource manager for estimating the power needs of said hardware accelerator and communicating the same to the native operating system.

19. A system on chip as claimed in claim 18, wherein said DSP firmware provides estimate of its power requirement to said resource manager which helps the resource manager to accurately estimate an exact power requirement of hardware accelerator.

20. A system on chip with efficient power management, comprising:
   a central processor;
   a power scheduler running on said central processor for power management of the system on chip;
   a plurality of other processors, each processor being configured to selectively lock and unlock each of a plurality of global feasibility variables based on a power requirement of the processor, the plurality of global feasibility variables respectively corresponding to distinct power modes of the system on chip;
   a means for dynamically defining a feasibility of entering a low power mode of operation based on at least one of said other processors dynamically locking or unlocking one or more of the global feasibility variables;
   a means for entering or exiting from a low power state based on said defined feasibility; and
   a resource manager for estimating power needs of at least one of said other processors and communicating the same to the power scheduler for efficient power management.

21. A system on chip as claimed in claim 20, wherein said locking/unlocking is done by incrementing/decrementing the feasibility variables.

* * * * *

UNITED STATES PATENT AND TRADEMARK OFFICE
CERTIFICATE OF CORRECTION

| | |
|---|---|
| PATENT NO. | : 7,689,839 B2 |
| APPLICATION NO. | : 11/498332 |
| DATED | : March 30, 2010 |
| INVENTOR(S) | : Laurent Uguen et al. |

It is certified that error appears in the above-identified patent and that said Letters Patent is hereby corrected as shown below:

<u>Column 12</u>
Lines 3 and 4, "respectively corresponding" should read as, --respectively correspond--.

Signed and Sealed this
Twenty-fifth Day of January, 2011

David J. Kappos
*Director of the United States Patent and Trademark Office*

UNITED STATES PATENT AND TRADEMARK OFFICE
CERTIFICATE OF CORRECTION

PATENT NO. : 7,689,839 B2  
APPLICATION NO. : 11/498332  
DATED : March 30, 2010  
INVENTOR(S) : Uguen et al.

Page 1 of 1

It is certified that error appears in the above-identified patent and that said Letters Patent is hereby corrected as shown below:

In the specification,

In Column 1, Line 8, delete "pending," and insert -- abandoned, --, therefor.

In the claims,

In Column 11, Line 67, in Claim 7, delete "variables locks." and insert -- locks. --, therefor.

Signed and Sealed this  
Third Day of May, 2016

Michelle K. Lee  
*Director of the United States Patent and Trademark Office*